(12) United States Patent
Martel et al.

(10) Patent No.: US 11,376,523 B2
(45) Date of Patent: Jul. 5, 2022

(54) INSTANTANEOUS WATER/OIL SEPARATION SYSTEM

(71) Applicant: RESEAU SYNAPSE INC., Jonquière (CA)

(72) Inventors: Christian Martel, Shipshaw (CA); Marc Nadeau, Jonquiere (CA)

(73) Assignee: RESEAU SYNAPSE INC.

( * ) Notice: Subject to any disclaimer, the term of this patent is extended or adjusted under 35 U.S.C. 154(b) by 0 days.

(21) Appl. No.: 16/959,673

(22) PCT Filed: Feb. 28, 2019

(86) PCT No.: PCT/CA2019/050235
§ 371 (c)(1),
(2) Date: Jul. 1, 2020

(87) PCT Pub. No.: WO2020/019056
PCT Pub. Date: Jan. 30, 2020

(65) Prior Publication Data
US 2021/0362076 A1    Nov. 25, 2021

Related U.S. Application Data

(60) Provisional application No. 62/703,926, filed on Jul. 27, 2018.

(51) Int. Cl.
*C02F 1/40* (2006.01)
*B01D 17/02* (2006.01)
(Continued)

(52) U.S. Cl.
CPC ...... *B01D 17/0214* (2013.01); *B01D 17/0211* (2013.01); *B01D 17/12* (2013.01);
(Continued)

(58) Field of Classification Search
CPC ............ B01D 17/0211; B01D 17/0214; B01D 17/12; C02F 1/40
(Continued)

(56) References Cited

U.S. PATENT DOCUMENTS 1,672,583 A * 6/1928 Travers .............. B01D 17/0211
                                                      210/538
3,794,583 A    2/1974 Rhodes
(Continued)

FOREIGN PATENT DOCUMENTS

| CA | 2226014 A1 | 12/1997 |
|---|---|---|
| EP | 2519957 B1 | 7/2017 |
| JP | 2014-155896 | 8/2014 |

OTHER PUBLICATIONS

ISR & WO—PCT/CA2019/050235—May 30, 2019.

*Primary Examiner* — Christopher Upton
(74) *Attorney, Agent, or Firm* — Lavery, De Billy, LLP; Gonzalo Lavin

(57) ABSTRACT

An instantaneous separation system for capturing and recovering oil from an outdoor electrical equipment. The system includes a capture system for capturing a mixture of oil and water and transporting the mixture to an instantaneous separation reservoir. The separation reservoir maintains the separated oil and water separate via a separation plate. A water outlet pipe transports the separated water back to the surroundings, an oil outlet pipe transports the separated oil to an oil reservoir; a nominal water level threshold maintains the separated water at a given water height by directing any water surpassing the water height to the surroundings via the water outlet pipe. The nominal water level threshold and the separation plate ensure that substantially only the separated water enters the water outlet pipe. An oil outlet threshold is
(Continued)

positioned at a height that is greater than the height of the nominal water level threshold.

9 Claims, 6 Drawing Sheets

(51) Int. Cl.
*B01D 17/12* (2006.01)
*C02F 101/32* (2006.01)

(52) U.S. Cl.
CPC ............ *C02F 1/40* (2013.01); *C02F 2101/32* (2013.01); *C02F 2209/42* (2013.01)

(58) Field of Classification Search
USPC ....... 210/86, 170.01, 170.03, 299, 305, 521, 210/538, 540, 747.1, 747.2, 747.3
See application file for complete search history.

(56) References Cited

U.S. PATENT DOCUMENTS

| | | |
|---|---|---|
| 4,035,302 A | 7/1977 | Seo |
| 4,202,778 A * | 5/1980 | Middelbeek ....... B01D 17/0211 210/522 |
| 4,422,931 A * | 12/1983 | Wolde-Michael .......................... B01D 17/0214 210/540 |
| 5,244,569 A * | 9/1993 | Di Amico .......... B01D 17/0214 210/170.01 |
| 5,305,779 A * | 4/1994 | Izaguirre ................... G05D 9/12 210/86 |
| 5,484,522 A * | 1/1996 | Entrekin ............ B01D 17/0214 137/392 |
| 5,637,234 A * | 6/1997 | McCasland ........ B01D 17/0211 210/540 |
| 5,686,696 A * | 11/1997 | Baker, Jr. ................ H01F 27/06 174/50 |
| 6,409,924 B1 | 6/2002 | Johnson et al. |
| 6,780,334 B1 | 8/2004 | Timmins et al. |
| 6,824,696 B1 | 11/2004 | Tolmie et al. |
| 6,919,034 B2 | 7/2005 | Kozak, III |
| 8,137,564 B2 * | 3/2012 | Gannon ............. B01D 17/0214 210/747.3 |
| 11,124,936 B2 * | 9/2021 | Ackles ...................... C02F 1/40 |
| 2005/0109707 A1 * | 5/2005 | Bryant ...................... E03F 5/12 210/747.3 |
| 2006/0157428 A1 * | 7/2006 | Brody ....................... E03F 5/14 210/521 |
| 2017/0217795 A1 | 8/2017 | Terrell et al. |

* cited by examiner

INSTANTANEOUS WATER/OIL SEPARATION SYSTEM

CROSS-REFERENCE TO RELATED APPLICATIONS

This application is a National Entry Application of PCT application No. PCT/CA2019/050235 filed on Feb. 28, 2019 and published in English under PCT Article 21(2), which itself claims benefit of U.S. patent application Ser. No. 62/703,926, filed on Jul. 27, 2018. All documents above are incorporated herein in their entirety by reference.

FIELD OF THE INVENTION

The present invention relates to an instantaneous water/oil separation system.

BACKGROUND OF THE INVENTION

Outdoor electrical equipment, such as high-power transformers, contain substantial quantities oil that may leak over time. In addition to oil escaping from the equipment, water from rain, melting snow as well as from other sources such as fire sprinklers must be collected as well. Thus, there is a need for a system to collect and then separate oil and water.

Typical oil/water separation systems require large retention basins, settling basins and separators to account for all the collected liquids. Historically, basins were built to capture liquids after major explosions but were ill suited for more common leaks that constitute the vast majority of situations requiring collection and separation. Further, typical systems use circular piping to form collections and for level control, which results in large variations in the water level in the reservoir, as the water level at the inlet varies. Finally, some current systems are prone to dangerous explosions when dealing with large oil leaks.

SUMMARY OF THE INVENTION

It is therefore a general object of the present invention to provide a high volume instantaneous water/oil separation system to capture and recover leaking oil from outdoor electrical equipment.

It is a further object of the present invention to provide an oil/water separation system that allows for instant separation of oil from water to recover it and allow for the discharge of hydrocarbon-free water to the environment.

It is a further object of the present invention to provide an oil/water separation system that allows for the management of large oil leaks and minimizing the risk of explosions while costing must less than current systems.

In order to address the above and other drawbacks, there is provided an instantaneous separation system for capturing and recovering oil from an outdoor electrical equipment, the system comprising a capture system, the capture system capturing a mixture of oil and water from the outdoor electrical equipment and transporting the mixture of oil and water to an instantaneous separation reservoir via an inlet pipe, the separation reservoir separating the mixture of oil and water to separated oil and separated water, the separation reservoir maintaining the separated oil and the separated water separate via a separation plate, a water outlet pipe, the water outlet pipe transporting the separated water back to the surroundings, an oil outlet pipe, the oil outlet pipe transporting the separated oil to an oil reservoir, a nominal water level threshold, the nominal water level threshold maintaining the separated water at a given water height by directing any water surpassing the water height to the surroundings via the water outlet pipe, wherein nominal water level threshold and the separation plate ensure that only the separated water enters the water outlet pipe, and an oil outlet threshold, the oil outlet threshold positioned at a height that is greater than the height of the nominal water level threshold, wherein when the separated oil reaches the height of the oil outlet threshold, the separated oil is directed to the oil reservoir via the oil outlet pipe, wherein the oil outlet threshold ensures that only the separated oil enters the oil outlet pipe.

In an embodiment, the outdoor electrical equipment is one of a high-power transformer, a measuring transformer, and an inductor.

In an embodiment, the water outlet pipe directs the separated water through a filter before transporting the separated water to the surroundings.

In an embodiment, the system further comprising a control panel to control the system.

In an embodiment, the capture system further comprises a wall erected around the base of the outdoor electrical equipment.

In an embodiment, a pre-separation of oil and water occurs inside the capture system.

In an embodiment, the capture system further comprises secondary capture zones to capture leaking oil from at least one cantilevered component of the electrical outdoor equipment.

In an embodiment, the separation reservoir further comprises a plurality of deflectors, the deflectors installed on the floor of the separation reservoir, the deflectors forcing the emersion of residual oil suspended in water towards the surface of the mixture of oil and water, a solid debris well for separating solids from the mixture of oil and water, the solid debris well receiving the mixture of oil and water via an elbow pipe, an oil detection well, the oil detection well comprising an oil level switch to detect when oil enters the separation reservoir, and a separation well, the separation well comprising the separation plate and a low water level switch, the low water level switch sending an alarm signal if the water height drops below a minimum water level.

In an embodiment, the system further comprising an oil detection system, the oil detection system comprising a cage comprising a plurality of flakes of hydrophobic, oil-absorbing material, wherein when the cage is in the presence of oil, the cage loses its buoyancy and actuates the oil level switch to activate an oil leak detection alarm.

In an embodiment, the water level threshold is U-shaped.

DETAILED DESCRIPTION OF THE ILLUSTRATIVE EMBODIMENTS

Figure 1:
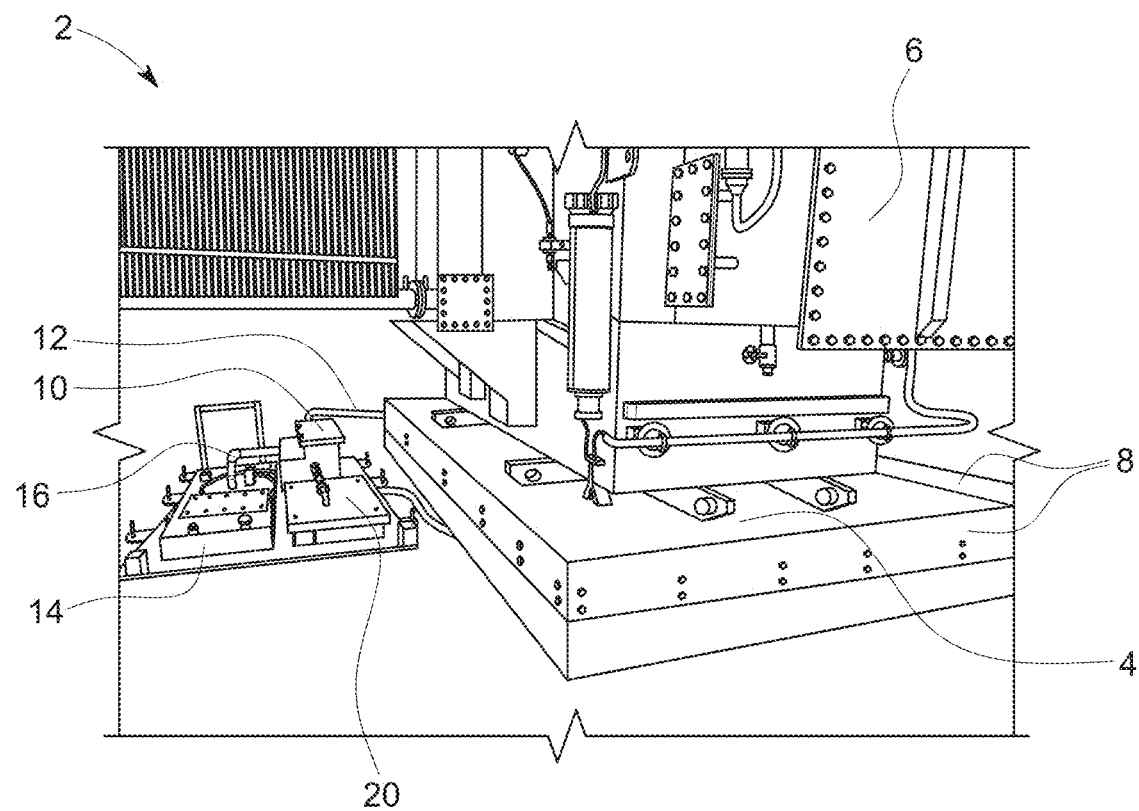
FIG. 1 is a perspective view of an instantaneous separation system, in accordance with an illustrative embodiment of the present invention.

Referring to FIG. 1, there is shown an instantaneous separation system for capturing and recovering oil, generally referred to using the reference numeral 2. A main capture system 4 is positioned at the base of an outdoor electrical equipment 6, illustratively a high-power transformer, from which oil may leak. The outdoor electrical equipment may also be a measuring transformer, an inductor, or any other outdoor equipment containing insulating oil. As a person of ordinary skill in the art would understand, the system 2 may also be used to capture leaking oil from other types of equipment containing oil such as oil reservoirs. The main capture system 4 comprises a wall 8 erected around the base of the foundation of the outdoor electrical equipment 6 that serves to capture any oil leaking from the outdoor electrical equipment 6, yet also captures water from sources such as rainfall and melting snow. As such, in order to recover the leaking oil, it must be separated from the captured water. In an embodiment, the instantaneous water/oil separation 2 further comprises secondary capture zones to capture leaking oil from cantilevered components of the outdoor electrical equipment 6. The height of the wall 8 may be based on the desired accumulation capacity for cases of rapid influxes of liquid, for example during a brief downpour. Advantageously, the main capture system 4 ensures that the oil never comes into contact with the ground, thus preventing any ground-based contamination. In a further embodiment, there is a step of pre-separation of oil and water within the main capture system 4. In another further embodiment, the system 2 comprises a heating system (as will be discussed below) to prevent freezing and obstruction of any of the various flowing liquids in cold temperatures.

Figure 2:
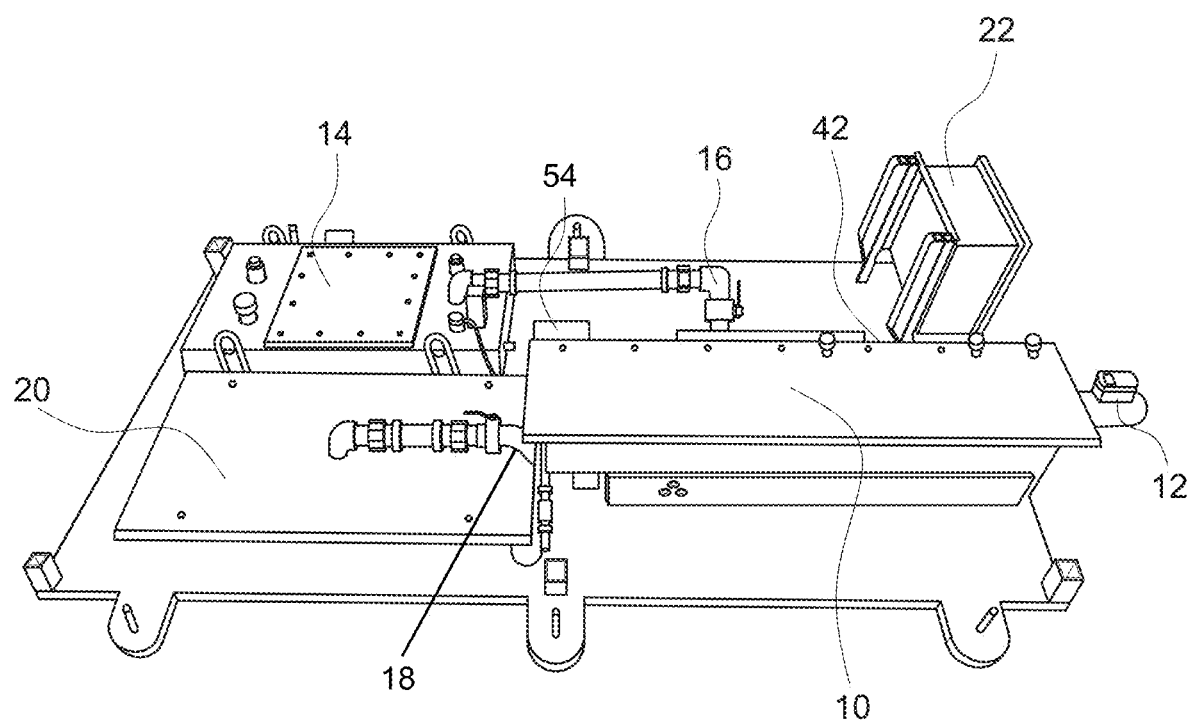
FIG. 2 is a perspective view of various components of an instantaneous separation system, in accordance with an illustrative embodiment of the present invention.

Referring now to FIG. 2 in addition to FIG. 1, the mixture of oil and water captured by the main capture system 4 is fed to an instantaneous separation reservoir 10 via an inlet pipe 12. In the separation reservoir 10, the mixture of oil and water is separated, as will be discussed in further detail below. Once the fluids are separated, the separated oil is transported to an oil reservoir 14 via an oil outlet pipe 16, and the separated water is directed to the surroundings via a water outlet pipe 18. In an embodiment, the oil reservoir 14 is equipped with an electrode-free water detector that can detect abnormal operations of the system 2, whereas a second level detector with a vibrating fork may allow for detection when the oil reservoir 14 is full. In an embodiment, the separated water first passes through a filter 20 before exiting substantially hydrocarbon-free towards the surroundings. The filter 20 blocks any oil from flowing to the surroundings and allows the system 2 to operate even under low pressure conditions. A detector in the filter 20 may detect if the filter becomes obstructed and send an alarm to the system 2. In a further embodiment, a control panel 22 is provided to control the various operations of the instantaneous separation system 2. Preferably, a pre-filtration grille (not show) is positioned before the inlet pipe 12. The grille blocks tree leaves, insects, such as butterflies and mosquitos, from penetrating into the separation reservoir 10.

Figure 3A:
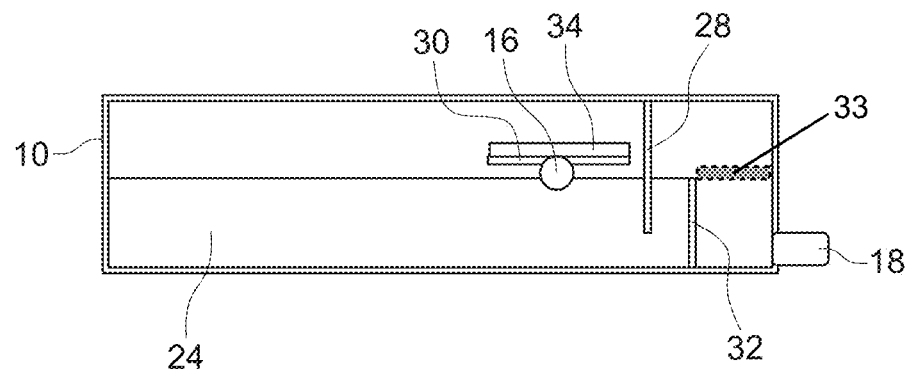
FIGS. 3A and 3B are side view diagrams of a separation reservoir containing only water and a mixture of water an oil, respectively, in accordance with an illustrative embodiment of the present invention.
Figure 3B:
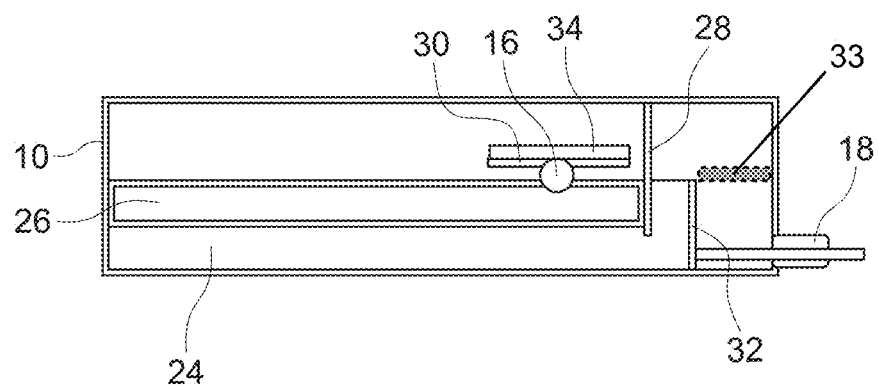

Referring now to FIGS. 3A and 3B, the separation reservoir 10 is shown comprising only water 24 and comprising both water 24 and oil 26, respectively. As a person of ordinary skill in the art would understand, the instantaneous separation of oil 26 from water 24 in the separation reservoir 10 occurs because the density of oil 26 is less than that of water 24 and thus, due to Archimedes' principle relating to buoyancy, the oil 26 is pushed towards the top of the water 24. In order to maintain the separation between the water 24 and the oil 26, the separation reservoir 10 comprises a separation plate 28. The separation plate 28 used in the present invention distinguishes itself from typical separation plates by its oil retention properties. The separation plate 28 further prevents the oil 26 from exiting the separation reservoir 10 via the water outlet pipe 18. As can be seen in FIG. 3B, the separation plate 28 confines the oil 26 in the separation reservoir 10 while allowing the water 24 to flow towards the water outlet pipe 18. System 2 is gravity based, and various components such as the deflectors 36 are angled to guarantee a minimum flow rate while avoiding any excessive turbulence.

Still referring to FIGS. 3A and 3B, the separation reservoir 10 comprises a pair of thresholds, an oil outlet threshold 30 and a nominal water level threshold 32, to maintain a consistent level of the fluids, as well as to ensure their separation is maintained. The oil outlet threshold 30 allows the oil 26 to exit the separation reservoir 10 through the oil outlet pipe 16 via an oil outlet window 34. The nominal water level threshold 32 regulates the level of water 24 in the separation reservoir 10 by diverting any water 24 exceeding the height of the nominal water level threshold 32 towards the water outlet pipe 18. The respective heights of the oil outlet threshold 30 and the nominal water level threshold 32 are selected such that no oil 26 can enter the water outlet pipe 18, and no water 24 can enter the oil outlet pipe 16. The respective heights of the oil outlet threshold 30 and the nominal water level threshold 32 are also selected based on the various flow rates of the system 2. Further, the height of the oil outlet threshold 30 is selected to ensure that the maximum amount of oil 26 is evacuated before the thickness of the oil 26 increases, which would allow the oil 26 to pass under the separation plate 28 and flow towards the water outlet pipe 18.

Figure 4:
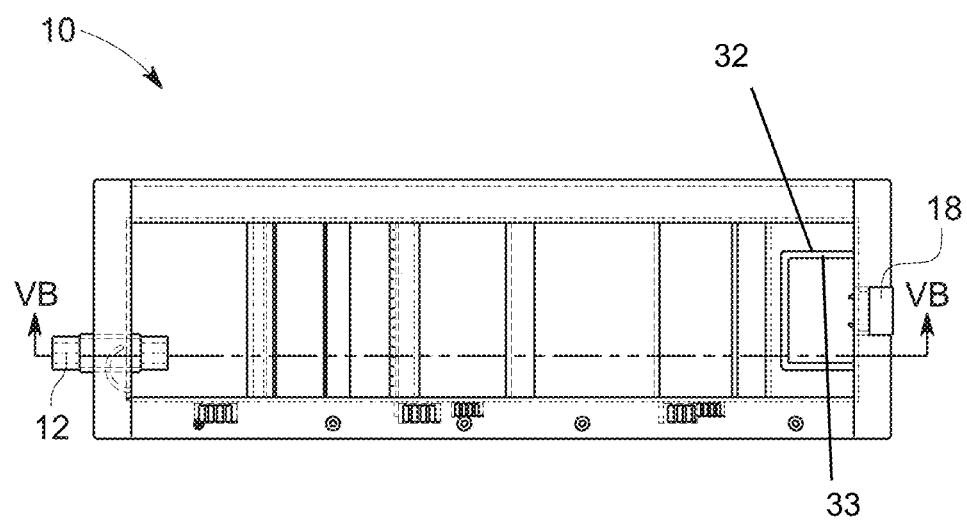
FIG. 4 is a top view diagram of a separation reservoir, in accordance with an illustrative embodiment of the present invention.
Figure 5A:
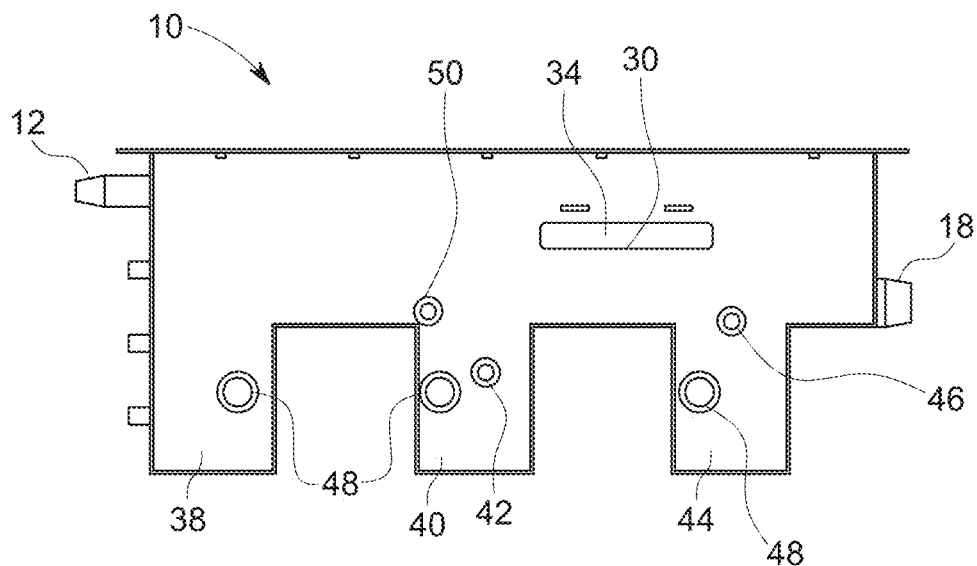
FIG. 5A is a side view diagram of the separation reservoir of FIG. 4.
Figure 5B:
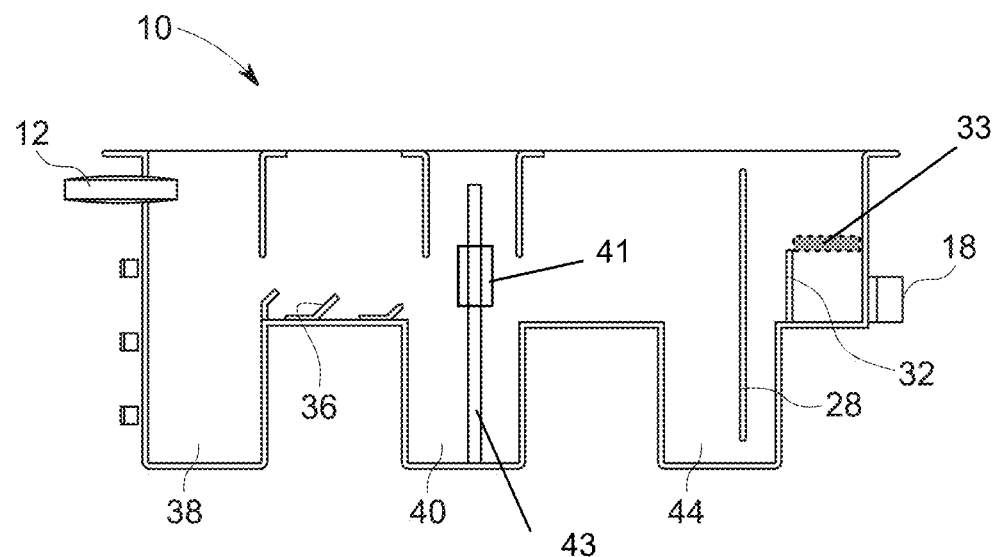
FIG. 5B is a sectional side view diagram of the reservoir of FIG. 4 along line VB-VB, in accordance with an illustrative embodiment of the present invention.

Referring now to FIGS. 4, 5A and 5B, an embodiment of the separation reservoir 10 is shown. A plurality of deflectors 36 are installed on the floor of the separation reservoir 10 to force the emersion of residual oil suspended in water towards the surface of the fluid mixture. The separation reservoir 10 further comprises a series of wells between the inlet pipe 12 and the water outlet pipe 18 to enhance the separation and retention processes. A solid debris well 38 is used to separate any solids that may be contained in the fluid mixture arriving in the separation reservoir 10 via the inlet pipe 12, and in an embodiment through an elbow pipe adjusted so that the fluid pours smoothly on the water surface. An oil detection well 40 comprises an oil level switch 42 in order to detect and notify the system 2 when oil enters the separation reservoir 10. Finally, a separation well 44 comprises the separation plate 28 (as discussed above) as well as a low water level switch 46 which may send an alarm signal to the system 2 if the water level in the separation reservoir 10 drops below a minimum value. Separation reservoir further comprises a plurality of heating elements 48 for the above-mentioned heating system, as well as a temperature sensor 50. In a further embodiment, the separation reservoir 10 comprises an oil detection system comprising a cage 41, for example a 3D-printed nylon cage, comprising a plurality of flakes of hydrophobic, oil-absorbing material. In the presence of water, the cage 41 floats along guide 43. In the presence of oil, the cage 41 loses its buoyancy and actuates the oil level switch 42 in order to activate an alarm signifying an oil leak. In a further embodiment, the water level threshold 32 is U-shaped, thus increasing the outlet surface 33 to aid in controlling the level of the water in the separation reservoir 10 when flow rates increase.

Figure 6:
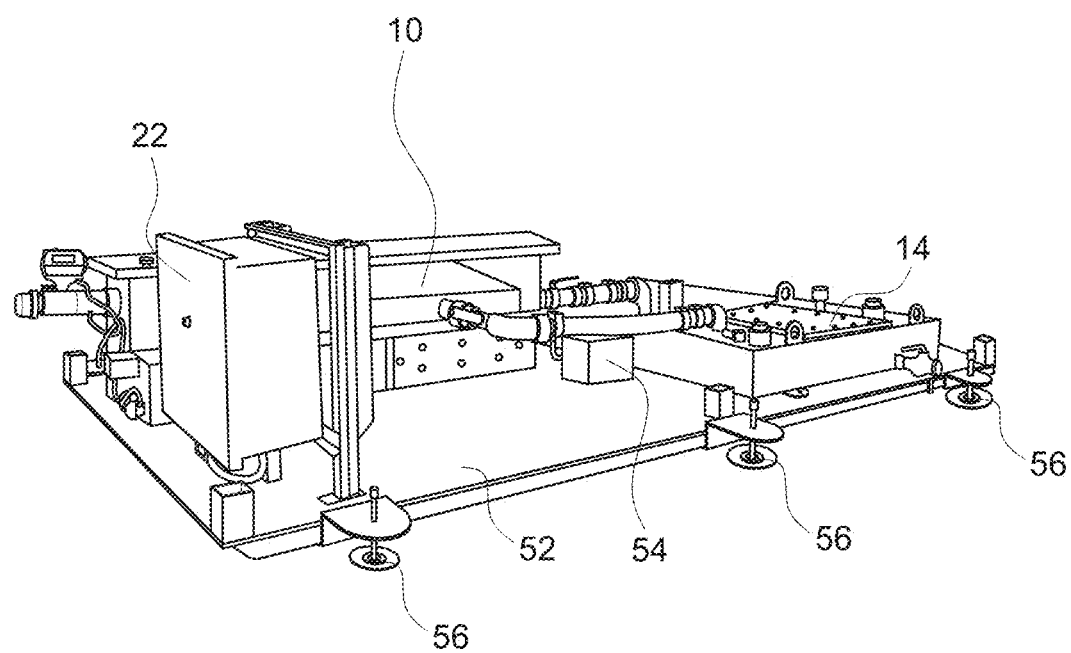
FIG. 6 is a rear perspective view of various components of an instantaneous separation system, in accordance with an illustrative embodiment of the present invention.

In an embodiment, the system 2 comprises an automated supervision system (not shown). This automated supervision system uses sensors to detect various abnormalities related to, for example, leaking oil, fluid levels, heating loss, and power loss. This automated supervision system may send alerts relating to these abnormalities through various means such as SMS or email. Referring now to FIG. 6, in a further embodiment, the system 2 is mounted on a leveling platform 52 comprising a tilt sensor 54 and a plurality of adjustable legs 56 in order to facilitate assembly of the various components, to level the system 2, and to detect any level losses.

The scope of the claims should not be limited by the preferred embodiments set forth in the examples, but should be given the broadest interpretation consistent with the description as a whole.

The invention claimed is:

1. An instantaneous separation system (2) for capturing and recovering oil from an outdoor electrical equipment (6), said system (2) comprising:
    a capture system (4) for capturing a mixture of oil and water from the outdoor electrical equipment (6) and transporting said mixture of oil and water to an instantaneous separation reservoir (10) via an inlet pipe (12), said separation reservoir (10) instantly separating said mixture of oil and water to separated oil (26) and separated water (24), said separation reservoir (10) maintaining said separated oil (26) and said separated water (24) separate via a separation plate (28);
    a water outlet pipe (18) for transporting said separated water (24) back to the surroundings;
    an oil outlet pipe (16) for transporting said separated oil (26) to an oil reservoir (14) and for recovering said separated oil;
    a nominal water level threshold (32) for maintaining said separated water (24) at a given water height by directing any water surpassing said water height to the surroundings via said water outlet pipe (18), wherein said nominal water level threshold (32) and said separation plate (28) ensure that substantially only said separated water (24) enters said water outlet pipe (18), wherein said nominal water level threshold (32) extends along a length that defines an outlet surface (33) on a portion of the separation reservoir (10); and
    an oil outlet threshold (30) positioned at a height that is greater than the height of said nominal water level threshold (32), wherein when said separated oil (26) reaches the height of said oil outlet threshold (30), said separated oil (26) is directed to said oil reservoir (14) via said oil outlet pipe (16), wherein said oil outlet threshold (30) ensures that substantially only said separated oil (26) enters said oil outlet pipe (16), and wherein the length of said nominal water level threshold (32) that defines said outlet surface (33) maintains said separated water (24) at said given water height.

2. The instantaneous separation system of claim 1, wherein the outdoor electrical equipment (6) is one of a high-power transformer, a measuring transformer, and an inductor.

3. The instantaneous separation system of claim 1, wherein said water outlet pipe (18) directs said separated water (24) through a filter (20) before transporting said separated water (24) to the surroundings.

4. The instantaneous separation system of claim 1, said system (2) further comprising a control panel (22) to control said system (2).

5. The instantaneous separation system of claim 1, wherein said capture system (4) further comprises a wall (8) erected around the base of the outdoor electrical equipment (6).

6. The instantaneous separation system of claim 5, wherein a pre-separation of oil and water occurs inside said capture system (4).

7. The instantaneous separation system of claim 5, wherein said separation reservoir (10) further comprises:
    a plurality of deflectors (36), said deflectors (36) installed on the floor of said separation reservoir (10), said deflectors forcing the emersion of residual oil suspended in water towards the surface of said mixture of oil and water;
    a solid debris well (38) for separating solids from said mixture of oil and water, said solid debris well (38) receiving said mixture of oil and water via said inlet pipe;
    an oil detection well (40), said oil detection well (40) comprising an oil level switch (42) to detect when oil enters said separation reservoir (10); and
    a separation well (44), said separation well (44) comprising said separation plate (28) and a low water level switch (46), said low water level switch (46) sending an alarm signal if the water height drops below a minimum water level.

8. The instantaneous separation system of claim 1, said system (2) further comprising an oil detection system, said oil detection system comprising a cage (41) comprising a plurality of flakes of hydrophobic, oil-absorbing material, wherein when said cage is in the presence of oil, said cage loses its buoyancy and actuates said oil level switch (42) to activate an oil leak detection alarm.

9. The instantaneous separation system of claim 1, wherein said water level threshold (32) is U-shaped along said length for increasing said outlet surface (33).

* * * * *